(12) United States Patent
Natarajan et al.

(10) Patent No.: US 7,848,241 B2
(45) Date of Patent: Dec. 7, 2010

(54) METHOD AND APPARATUS FOR HANDOFF CONTROL IN MOBILE COMMUNICATIONS SYSTEMS

(75) Inventors: Kadathur S. Natarajan, Wilmette, IL (US); Dragan M. Boscovic, South Barrington, IL (US); Gerald J. Gutowski, Glenview, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 860 days.

(21) Appl. No.: 11/343,491

(22) Filed: Jan. 31, 2006

(65) Prior Publication Data
US 2007/0177510 A1  Aug. 2, 2007

(51) Int. Cl.
*G01R 31/08* (2006.01)
*H04W 4/00* (2009.01)
*H04W 36/00* (2009.01)

(52) U.S. Cl. .................. 370/238; 370/328; 455/436

(58) Field of Classification Search ................ 370/331, 370/332, 335, 238, 328, 347, 229, 252, 230, 370/235; 455/436, 67.1, 437, 12.1, 561, 455/552.1, 439, 442, 449, 450, 454, 553.1, 455/560, 441, 440, 447, 562, 426, 432, 434
See application file for complete search history.

(56) References Cited

U.S. PATENT DOCUMENTS

| | | | |
|---|---|---|---|
| 5,734,646 A | 3/1998 | I et al. | |
| 6,879,574 B2 | 4/2005 | Naghian et al. | |
| 2001/0022558 A1 | 9/2001 | Karr, Jr. et al. | |
| 2003/0231594 A1 * | 12/2003 | Xu et al. | 370/236 |
| 2004/0087340 A1 | 5/2004 | Cao et al. | |
| 2004/0228349 A1 * | 11/2004 | Vrzic et al. | 370/395.4 |
| 2005/0153725 A1 | 7/2005 | Naghian et al. | |
| 2006/0153233 A1 * | 7/2006 | Chen et al. | 370/468 |
| 2006/0268689 A1 * | 11/2006 | Tarraf et al. | 370/229 |

OTHER PUBLICATIONS

IEEE Standards 802.16™, IEEE Std 802.16™ -2004(Revision of IEEE Std 802.16-2001), IEEE Standard for Local and metropolitan networks, Part 16: Air Interface for Fixed Broadband Wireless Access Systems, IEEE Computer Society and the IEEE Microwave Theory and Techniques Society, Oct. 1, 2004, p. 7.

\* cited by examiner

*Primary Examiner*—Melody Mehrpour

(57) ABSTRACT

A mobile communications system includes a first base station to service a first set of connections from a first set of mobile communications devices to a communications network. A set of neighboring base stations is in communication with the first base station. In an embodiment of the invention, the first base station prioritizes the first set of connections according to first predetermined criteria and prioritizes the set of neighboring base stations according to second predetermined criteria. The prioritization lists are used in deterministic ways to alleviate potential congestion in backhaul links and optimize the overall performance of system and improved quality of service.

18 Claims, 3 Drawing Sheets

METHOD AND APPARATUS FOR HANDOFF CONTROL IN MOBILE COMMUNICATIONS SYSTEMS

TECHNICAL FIELD

This invention relates generally to balancing of loads on backhaul and sidehaul links in a wireless network.

BACKGROUND

Mobile communications networks utilize a plurality of base stations to connect mobile communication subscriber stations to a wireless network. Each of the mobile communication subscriber stations initially communicates with a base station to exchange information with the wireless network when located in a cell area serviced by the base station. However, the connections made on the mobile communication subscriber stations often must be handed off to different base stations when the mobile communication subscriber stations physically move from cell to cell or when the current servicing base station experiences congestion while servicing other mobile communication subscriber stations.

Connections made on the mobile communication subscriber stations are currently handed off from one base station to another base station based on (a) status of radio access network/resource availability and (b) movement of the mobile communication subscriber station. The end-to-end performance of applications is dependent on performance achievable on the air-interface as well as the network (including the backhaul to the core network) to which the base stations are connected. With next-generation networks capable of broadband wireless speeds, the bottleneck in end-to-end performance may shift to the backhaul network, resulting in slower servicing of connections and a higher probability of dropped connections.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

Generally speaking, pursuant to these various embodiments, the handoff of a mobile subscriber station from one base station to another is affected to minimize the presence of backhaul bottlenecks between a base station and a core communications network. The mobile subscriber station may comprise, e.g., a cellular telephone. The manner of handing off the mobile subscriber station utilizes "sidehaul" communication, i.e., direct communication from one base station to another, to determine a suitable base station handoff candidate and accounts for the state of the "backhaul" communication, i.e., communication from the base station to the core network, to improve overall end-to-end performance and reduce latency for mobile services.

By one approach, some/all of the base stations in the network maintain a list of neighboring base stations. The list includes information about the backhaul congestion between neighboring base stations and the core network. The information pertaining to the backhaul congestion of neighboring base stations may be obtained directly from the neighboring base stations instead of or in addition to acquiring such information from the core network. Based on the list, a base station that experiences a backhaul bottleneck judiciously hands off at least one connection from a mobile subscriber stations based on predetermined criteria to at least one neighboring base stations until the bottleneck abates. Alternatively, the base station may maintain a prioritized list of neighboring base stations to which a connection made with a mobile subscriber station may be handed off even before any backhaul bottlenecks arise.

Figure 1:
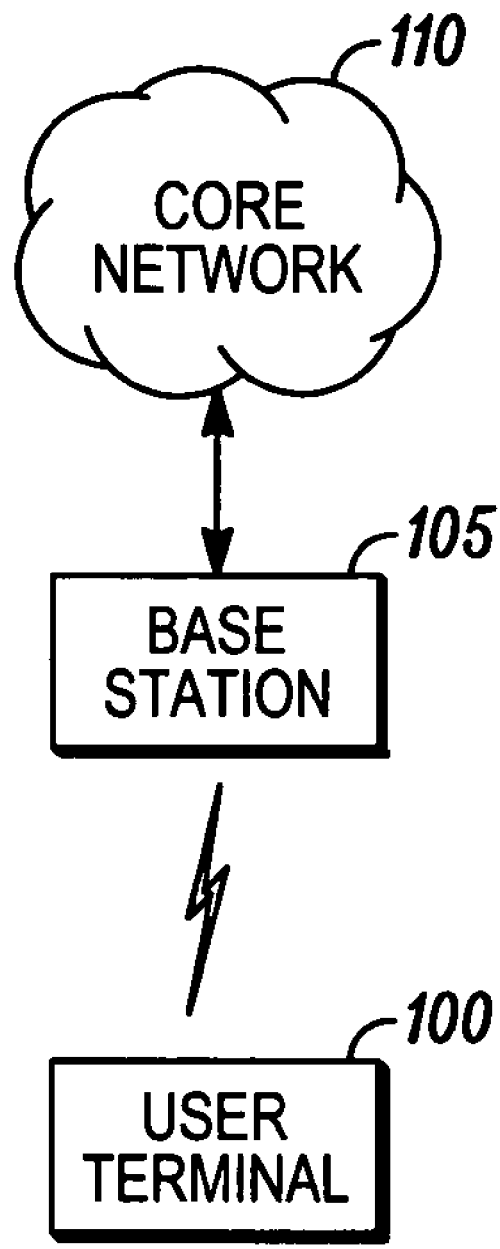
FIG. 1 illustrates a mobile subscriber station in communication with a base station according to an embodiment of the invention.

FIG. 1 illustrates a mobile subscriber station 100 in communication with a base station 105 according to an embodiment of the invention. As discussed above, the mobile subscriber station 100 may comprise, e.g., a cellular telephone. The mobile subscriber station 100 is in communication with the base station 105 when a connection is made via the mobile subscriber station 100. When the connection is made, voice data is transmitted between the mobile subscriber station 100 and the base station 105. The base station 105 is also in communication with a core network 110. The core network 110 may comprise, e.g., 3rd generation (3G) network elements. The voice data is transmitted from the base station 105 through the core network 110 and onto its final destination which may be, e.g., another base station in communication with another mobile subscriber station.

The mobile subscriber station 100 may be in communication with the base station 105 when physically located within the base station's 105 cell, i.e., its service area. However, there is often a plurality of base stations in the same geographical area having overlapping cell coverage. Accordingly, a connection made with the mobile subscriber station 100 may often be handled by either this base station 105 or another base station within the same geographical area.

Each base station has a limited amount of backhaul bandwidth for communicating with the core network 110. Accordingly, the base station 105 can simultaneously service a limited number of connections before hitting the backhaul bandwidth limit and adversely affecting the servicing of existing connections. An embodiment of the invention makes more efficient use of a set of base stations by selectively handing off connections made on mobile subscriber stations 100 from one base station to another to reduce backhaul congestion on a busy base station. Each base station acquires information about adjacent base stations from the adjacent base stations themselves and/or directly from the core network 110 and then selectively hands off mobile subscriber stations 110 to neighboring base stations when backhaul bottlenecks arise.

Alternatively, even if a backhaul bottleneck is not present, the neighboring base station to which a serviced connection is to be handed off is selected from among available base stations based on the amount of backhaul bandwidth available (i.e., the connection is handed off to a neighboring base station having a relatively low level of backhaul traffic).

Figure 2:
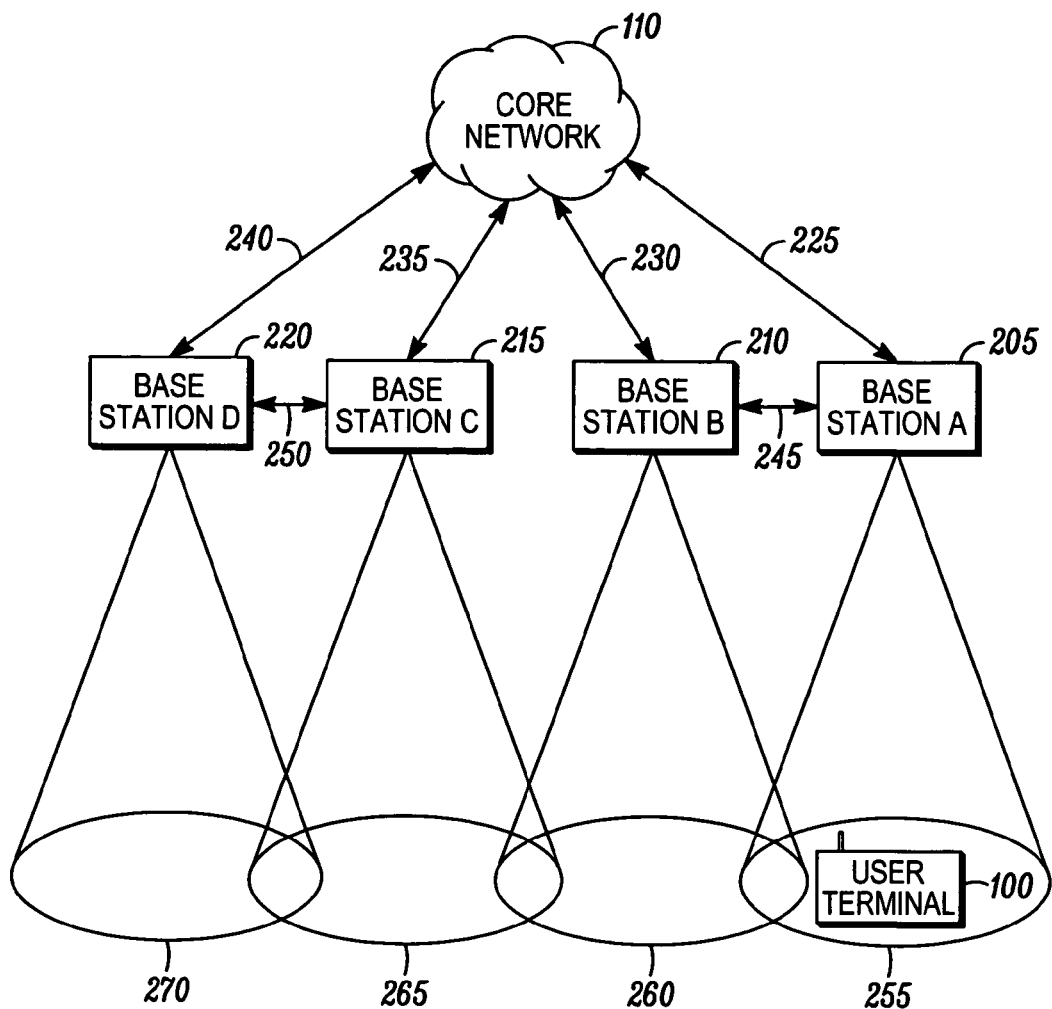
FIG. 2 illustrates a communications network according to an embodiment of the invention.

FIG. 2 illustrates a communications network 200 according to an embodiment of the invention. As shown, the communications network includes base station A 205, base station B 210, base station C 215, and base station D 220. Although only four base stations are illustrated, one of ordinary skill in the art will appreciate that many additional base stations may be utilized in the communications network. Each of base stations A 205, B 210, C 215, and D 220 is in communication with the core network 110. Information transmitted between, for example, base station A 205 and the core network 110 includes voice data, identities of neighboring base stations, and so forth. Information is transmitted between each of the base stations and the core network via corresponding backhaul links 225, 230, 235, and 240, respectively.

By these teachings the base stations also communicate information between each other. For example, base station A 205 may communicate with base station B 210 via sidehaul link 245, and base station C 215 may communicate with base station D 220 via sidehaul link 250. Each of the base stations provides wireless service to a corresponding cell area. For example, base station A 205 provides wireless service to cell 255, base station B 210 provides wireless service to cell 260, base station C 215 provides wireless service to cell 265, and base station D 220 provides wireless service to cell 270.

Each of the base stations maintains a list of the neighboring base stations and an overlay of the technology utilized by each neighboring base station. For example, one of the base stations may communicate via a Worldwide Interoperability for Microwave Access (WiMAX) network, and a neighboring base station may communicate via a Code Division Multiple Access (CDMA) network. Accordingly, the information about the base station technology is included on the list as the overlay for each particular neighbor base station. The list of neighboring base stations is utilized when handing over a mobile subscriber station 100 to a neighboring base station when, for example, the base station is experiencing a backhaul bottleneck. The list of neighboring base stations may categorize the neighboring base stations according to the best handoff candidates.

At each of the base stations A 205, B 210, C 215, and D 220, there may be a plurality of connections being serviced at a particular time. If too many connections are being serviced at once on, for example, base station A 205, the backhaul to the core network 110 for base station A 205 will become congested or overloaded. Accordingly, the servicing of each of the connections may slow or some of the connections may be dropped. In other words, the heavier the backhaul traffic is at a given base station, the more likely that base station will experience difficulty in properly handling/servicing an additional mobile unit planning to attach to that base station. To avoid this problem, a base station experiencing congestion may hand off a mobile subscriber station 100 or multiple mobile subscriber stations 100 to a neighboring base station or multiple neighboring base stations. The decision as to which neighboring base station(s) to hand off the one or more mobile subscriber stations 100 may be made based on the information acquired via sidehaul links from adjacent base stations. By acquiring this information via the sidehaul links, accurate information about the potential handoff candidates may be obtained and the amount of backhaul between a congested base station and the core network is kept at a more optimal level.

Figure 3:
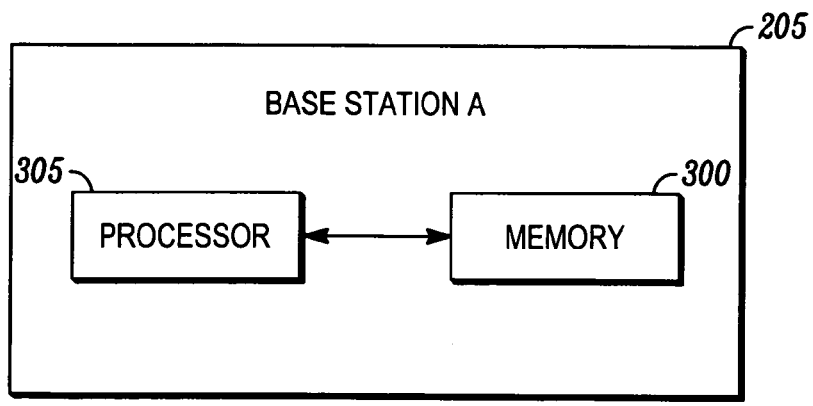
FIG. 3 illustrates a base station according to an embodiment of the invention.

FIG. 3 illustrates base station A 205 according to an embodiment of the invention. As shown, base station A 205 includes a memory 300 in which the list of neighboring base stations and the overlay for each of the base stations may be stored. Base station A 205 also includes a processor 305 in communication with the memory 300. Other elements (not shown in the diagram) include RF and antenna subsystems.

When the congestion, i.e. utilization, on any backhaul link 225 at base station A 205 exceeds a predetermined threshold (e.g., 80% of capacity), base station A 205 may conclude that the backhaul link 225 is congested and try to alleviate the problem by making judicious handoff decisions that keep traffic away from the backhaul link 225. When a new connection is attempting to hand in to base station A 205, it will check to determine whether the traffic is to be carried on the bottleneck link at base station A 205. If it is, the hand in attempt will be rejected after the evaluated hand in connection's priority has been interrogated, or determined to be of insufficient merit to further load base station A 205, even if base station A 205 has sufficient additional resources, such as air interface resources, available to serve the connection.

Merit may be assessed by associating each/all connection identifiers for all currently serviced connections to a base station as an aggregate Traffic Rate and associating the additional hand in candidates' loads to check if the new aggregate load from all potential service flows exceed the backhaul base station threshold.

Figure 4:
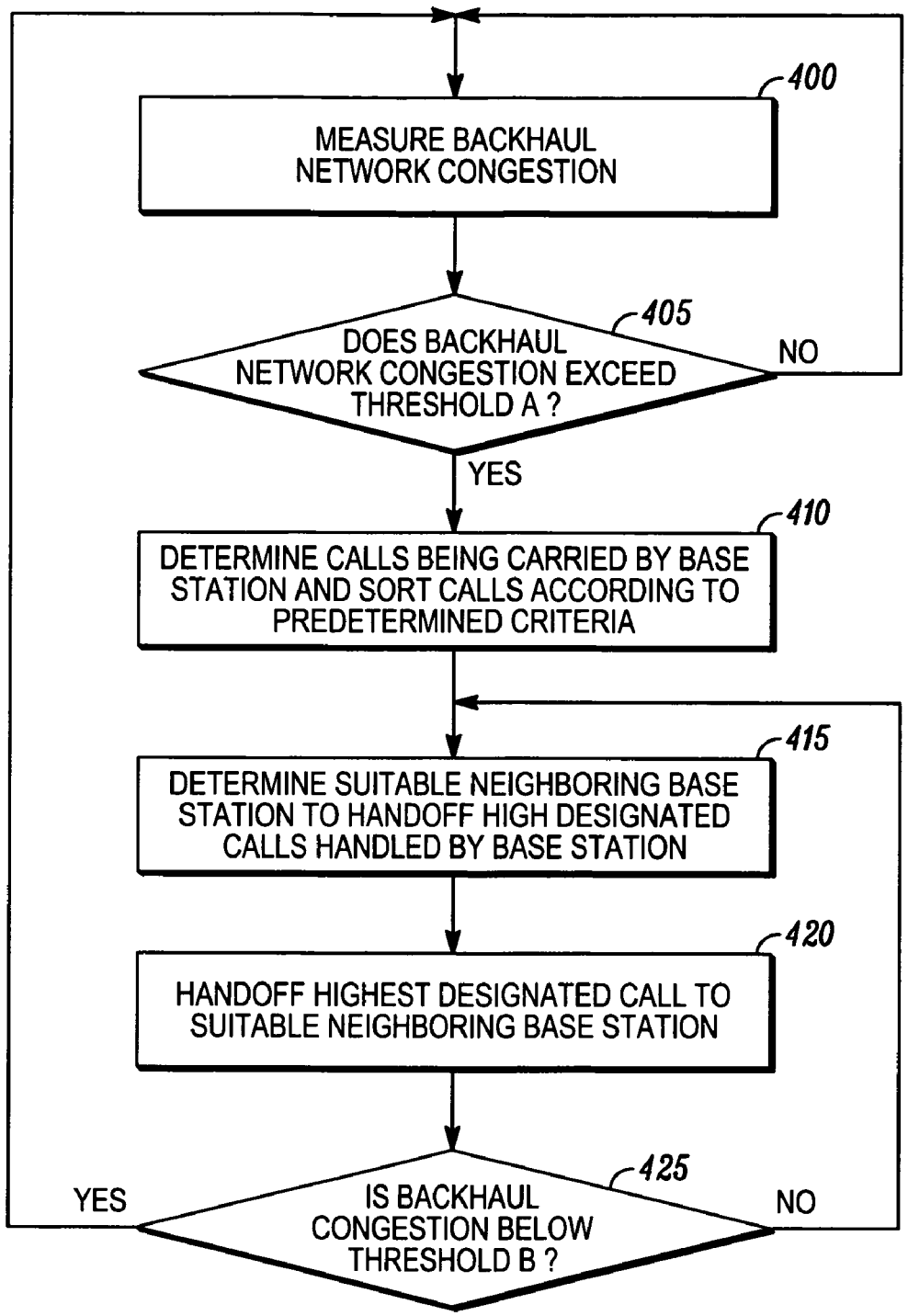
FIG. 4 illustrates a method of managing base station backhaul congestion according to an embodiment of the invention.

FIG. 4 illustrates a method of managing base station A's 205 backhaul congestion according to an embodiment of the invention. First, at operation 400, base station A's 205 backhaul congestion to the core network 110 is measured. This measurement may be performed by the processor 305 shown in FIG. 3. Next, at operation 405, the processor 305 determines whether the backhaul network congestion exceeds "Threshold A," a predetermined threshold congestion level. For example, as discussed above, "Threshold A" may be set to 80% of backhaul link capacity. If the backhaul network congestion does not exceed Threshold A, processing returns to operation 400. However, if Threshold A is exceeded, processing proceeds to operation 410 where the processor 305 determines which connections are being carried by base station A 205 and sorts the connections according to predetermined designation criteria. The predetermined criteria may include, but are not limited to, (a) the bandwidth used by each particular connection, or (b) the premium paid service class of each connection. Additional relevant criteria may also be utilized to sort the connections.

Next, at operation 415, the processor 305 determines a suitable base station to hand off the mobile subscriber station having the highest designated connection being handled by base station A 205. At operation 420, the highest designated connection is handed off to the most suitable neighboring base station. Finally, at operation 425, the processor 305 determines whether the backhaul congestion between base station A 205 and the core network 110 is below a second threshold, "Threshold B." For example, Threshold B may be 70% utilization of the backhaul link capacity. If the backhaul congestion is below Threshold B, then processing returns to operation 400. However, if the backhaul congestion is not below Threshold B, processing returns to operation 415.

Accordingly, the process illustrated in FIG. 4 reduces the backhaul congestion of base station A 205 from over 80% to under 70%. Various safeguards may be implemented to ensure optimal performance of this method. For example, if base station A 205 is experiencing significant backhaul congestion and the performance of the method shown in FIG. 4 results in a mobile subscriber station 100 being handed off to base station B, the same mobile subscriber station 100 cannot be handed back to base station A until the backhaul congestion remains below Threshold B for a predetermined time period. This safeguard prevents an "oscillation" problem from occurring between base stations A 205 and 210 (i.e., to prevent a "ping-pong effect" of a mobile subscriber station being handed back and forth frequently) by introducing a certain hysteresis effect through the handoff threshold criteria.

Alternatively, the available base stations may be prioritized according to predetermined criteria. For example, the base station having the largest amount of available backhaul may be assigned the highest priority. Whenever a connection is to be handed off such as, e.g., when the mobile subscriber station moves out of a cell, the connection is handed off to the neighboring base station having the highest priority.

In an alternative embodiment, decisions to hand off mobile subscriber stations may be made according to a centralized backhaul-state dependent handoff decision method. To implement this method, a mobile unit handoff utility, a backhaul control unit, and a base station control unit are utilized. Each base station control unit reports on the load conditions on its backhaul/sidehaul links to the backhaul control unit.

The mobile unit handoff utility is used by the backhaul control unit in agreement with the base station control unit to transfer a mobile subscriber unit or a number of mobile subscriber units from one base station site to another base station site in order to relieve the backhaul resource pressure on the particular backhaul link. As discussed above, this method involves cooperation between the two control units. Alternatively, if the handoff procedure is terminal-controlled then it will require information exchange and agreement between the terminal and the backhaul control unit.

The mobile unit handoff utility may also be utilized to monitor a plurality of sessions between a mobile subscriber unit and the base station. For example, if multiple sessions exist on the mobile subscriber unit, the total congestion caused by the mobile subscriber unit may be expressed as an aggregate threshold of load based on connection identifiers as defined in section 3.13 of 802.16™ IEEE Standard for Local and Metropolitan Area Networks, Part 16: Air Interface for Fixed Broadband Wireless Access Systems, Oct. 1, 2004.

As discussed above, a mobile subscriber unit may be handed over from a base station utilizing, e.g., Global System for Mobile communication ("GSM") to a different base station utilizing 802.16, as referenced above. This would be a "heterogeneous" handover, as opposed to a "homogeneous" handover, because the base stations have a different overlay.

When a mobile subscriber unit is to be handed off from a base station utilizing one technology to a different base station utilizing a different technology, the hand off may sometimes be rejected even when air interface resources exist. For example, if a mobile subscriber station is handed off from a base station utilizing GSM to a base station utilizing 802.16e, even though there may be sufficient air interface resources, the hand off may be rejected if there is insufficient backhaul available for meeting, e.g., the jitter and latency requirements. A corresponding data field may indicate why the hand off was rejected.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the current inventive concept.

We claim:

1. A mobile communications system, comprising:
    a first base station to service a first set of connections from a first set of mobile communications devices to a core network;
    a set of neighboring base stations in communication with the first base station;
    wherein the first base station prioritizes the first set of connections according to first predetermined criteria, and prioritizes the set of neighboring base stations according to second predetermined criteria; and
    wherein in response to a backhaul congestion between the first base station and the core network exceeding a first predetermined threshold level, the first base station hands off at least one of the prioritized connections to a base station in the set of neighboring base stations until the backhaul congestion is below a predetermined second threshold level.

2. The mobile communications system of claim 1, wherein the handing off of the at least one prioritized connection is rejected in response to insufficient backhaul availability for the base station in the set of neighboring base stations, a corresponding data field indicating a reason for the rejection.

3. The mobile communications system of claim 1, wherein the first base station comprises a memory device to store a list of the set of neighboring base stations, the list including a set of backhaul measurements and overlay technology corresponding to each base station in the set of neighboring base stations.

4. The mobile communications system of claim 1, wherein the predetermined first threshold level is greater than the predetermined second threshold level.

5. The mobile communications system of claim 1, wherein the first base station comprises a processing device to detect an amount of the backhaul congestion between the first base station and the network.

6. The mobile communications system of claim 1, wherein the first predetermined criteria is selected from a group consisting of: bandwidth utilization and premium service classification.

7. The mobile communications system of claim 1, wherein a specific neighboring base station of the set of neighboring base stations is selected to receive the at least one handed off connection such that a second backhaul congestion of the specific neighboring base station is below a third threshold level after the handoff.

8. The mobile communications system of claim 1, wherein the second predetermined criteria comprises a detected amount of available bandwidth.

9. A method, comprising:
    servicing, at a first base station, a first set of connections from a first set of mobile communications devices to a core network;
    determining backhaul congestion between the first base station and the core network to provide determined backhaul congestion;
    prioritizing the first set of connections according to predetermined criteria in response to the determined backhaul congestion being greater than a first predetermined threshold level to provide prioritized connections; and
    handing off at least one of the prioritized connections to a base station in a set of neighboring base stations until the backhaul congestion is below a predetermined second threshold level.

10. The method of claim 9, further comprising storing, at the first base station, a list of the set of neighboring base stations, wherein the list includes a set of backhaul measurements and overlay corresponding to each one of the set of neighboring base stations.

11. The method of claim 9, wherein the predetermined first threshold level is greater than the predetermined second threshold level.

12. The method of claim 9, wherein the predetermined criteria is selected from a group consisting of: bandwidth utilization and premium service classification.

13. The method of claim 9, further including determining the backhaul congestion based on individual connection identifiers for the first set of connections.

14. The method of claim 9, further comprising selecting a specific neighboring base station of the set of neighboring base stations to receive the at least one handed off connection such that a second backhaul congestion of the specific neighboring base station is below a third threshold level after the handoff.

15. A base station, comprising:
circuitry to service a first set of connections from a first set of mobile communications devices to a core network;
a memory device to store a list of a set of neighboring base stations; and
a processing device operably coupled to the circuitry and the memory device to detect an amount of backhaul congestion between the base station and the core network and being configured and arranged to respond to backhaul congestion between the base station and the core network that exceeds a first predetermined threshold level by prioritizing the first set of connections according to predetermined criteria and handing off at least one prioritized connection to a base station in a set of neighboring base stations until the backhaul congestion is below a predetermined second threshold level.

16. The base station of claim 15, wherein the list further comprises a set of backhaul measurements and overlay corresponding to each base station in the set of neighboring base stations.

17. The base station of claim 15, wherein the predetermined first threshold level is greater than the predetermined second threshold level.

18. The base station of claim 15, wherein the predetermined criteria is selected from a group consisting of: bandwidth utilization and premium service classification.

* * * * *